Figure 1:
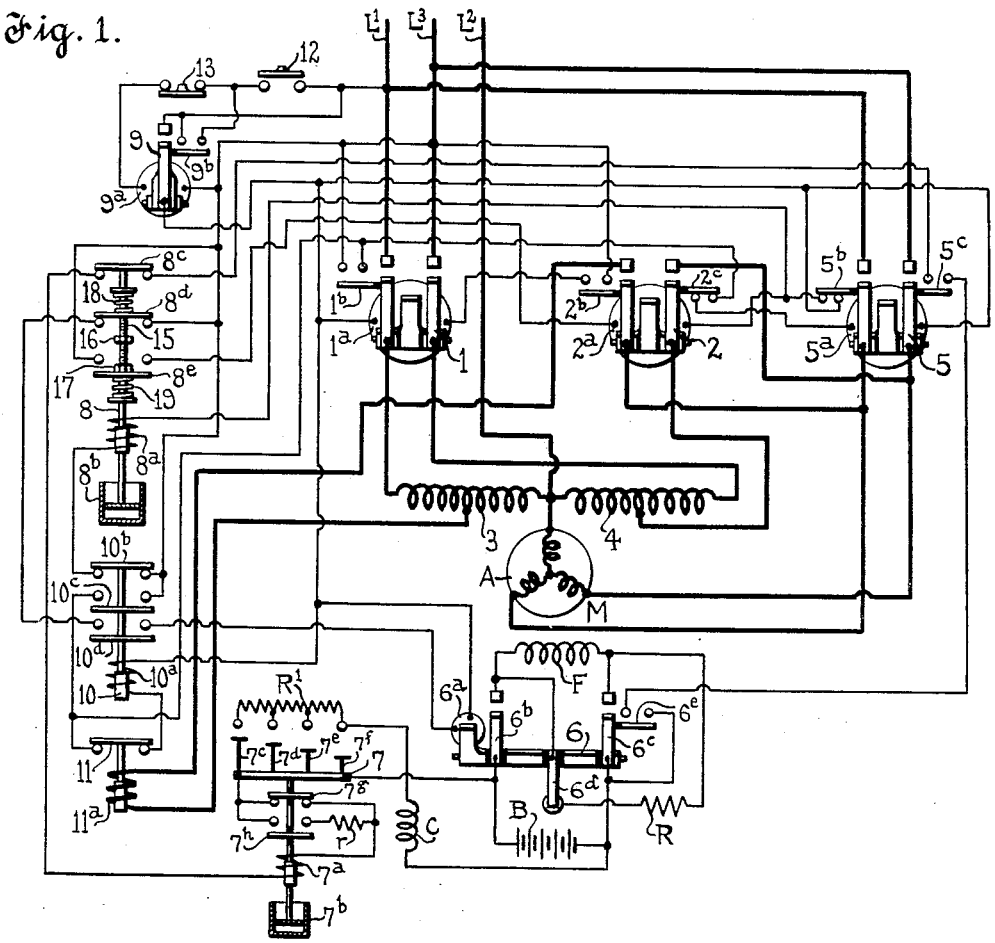

May 29, 1928.

W. O. BAER 1,671,218

MOTOR CONTROLLER

Filed March 5, 1925

INVENTOR.
Walter O. Baer.
BY
ATTORNEY

Patented May 29, 1928.

1,671,218

UNITED STATES PATENT OFFICE.

WALTER O. BAER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed March 5, 1925. Serial No. 13,091.

This invention relates to motor controllers and is particularly applicable to starting controllers for cynchronous motors.

Controllers for synchronous motors are commonly provided with electromagnetically operated switches for selectively establishing low voltage starting connections and high voltage running connections for the motor armature and a switch for connecting the field of the motor to a direct current source. In practice it has been found that the design of the motor and certain other conditions renders it necessary in some instances to effect closure of the running switch prior to closure of the field switch, and, in other instances, to effect closure of such switches in reversed sequence.

The present invention has among its objects to provide a controller for synchronous motors including the above-mentioned switches, and means for varying the sequence of closure of the running switch and the field control switch.

Another object is to provide a controller of the aforesaid character including a timing relay having contacts associated therewith which are adjustable to vary the sequence of closure of the running switch and the field control switch.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing:

Figure 1 diagrammatically illustrates a controller embodying the invention, and

Figure 2:
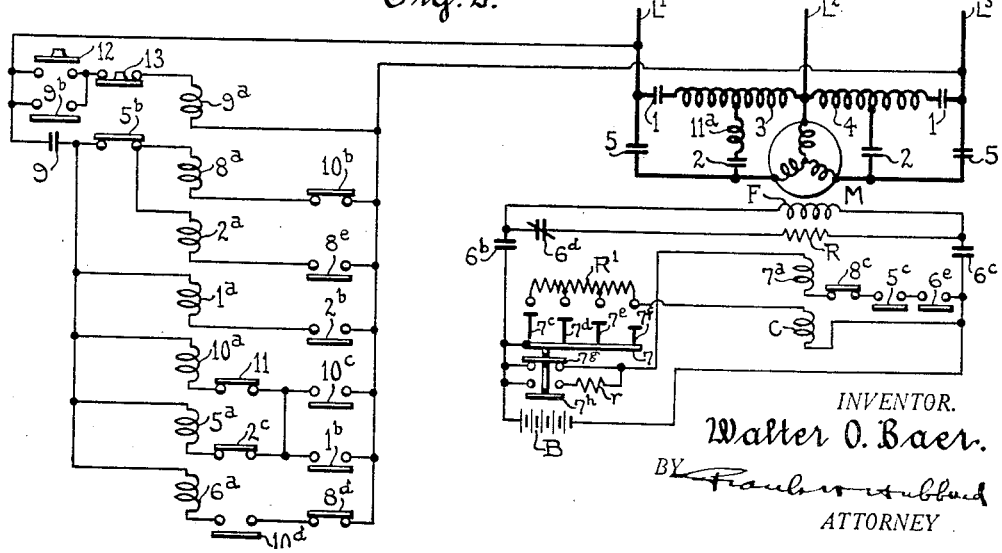

Fig. 2 is a so-called across-the-line diagram of the circuit connections of the controller shown in Fig. 1.

Referring to Fig. 1, the same illustrates a synchronous motor M having an armature A to be supplied with current from a three-phase alternating current circuit indicated by lines $L^1$, $L^2$ and $L^3$, and a field F to be supplied with current from a suitable direct current source, as, for example, a battery B. As hereinafter set forth, the motor is adapted to be brought up to speed and thereafter connected to its load by a suitable electromagnetic clutch, the operating winding of said clutch being indicated by reference character C.

The controller for motor M includes a pair of double pole electromagnetic starting switches 1 and 2 for connecting the armature A to lines $L^1$, $L^2$ and $L^3$ through the medium of low voltage taps on compensator windings 3 and 4, and a double pole electromagnetic running switch 5 for connecting said armature directly to lines $L^1$, $L^2$ and $L^3$. The field F of the motor is controlled by an electromagnetic switch 6, such switch having normally open contacts $6^b$ and $6^c$ for connecting the field F across the terminals of battery B, and a normally closed contact $6^d$ for shunting a resistance R across the terminals of field F. The operating winding C of the aforementioned clutch is controlled by a device 7, having an operating winding $7^a$. Device 7 is retarded during response by a dash pot $7^b$ and the same is provided with normally open contacts $7^c$, $7^d$, $7^e$ and $7^f$. Contact $7^c$ serves to connect the clutch winding C across the terminals of battery B through a resistance $R^1$, and contacts $7^d$, $7^e$ and $7^f$ thereafter act progressively to exclude said resistance from the circuit of said winding in steps.

The control means for the aforementioned switches includes relays 8, 9, 10 and 11. Relay 8 is provided with an operating winding $8^a$ and during return movement thereof to normal position the same is retarded by a dash pot $8^b$. Relay 8 is further provided with normally closed contacts $8^c$ and $8^d$ and a normally open contact $8^e$. For a purpose hereinafter set forth contacts $8^d$ and $8^e$ are adjustable to provide for closure of contact $8^d$ prior to opening of contact $8^e$ or for closure of contact $8^d$ following opening of contact $8^e$. Relay 9 is provided with an operating winding $9^a$ and the energizing circuit thereof is controlled by a normally open push button 12 and a normally closed push button 13. As hereinafter set forth relay 9 is provided with a normally open auxiliary contact $9^b$ for establishing a maintaining circuit therefor through push button 13. Relay 10 is provided with an operating winding $10^a$, a normally closed contact $10^b$ and normally open contacts $10^c$ and $10^d$, and relay 11 is normally closed and is provided with an operating winding $11^a$ to be included in series with the motor during starting thereof.

The control means further includes the following auxiliary contacts. Starting switch 1 is provided with a normally open auxiliary contact $1^b$, and starting switch 2 is provided with a normally open auxiliary contact $2^b$ and a normally closed auxiliary contact $2^c$. Running switch 5 is provided with a normally closed auxiliary contact $5^b$ and a normally open auxiliary contact $5^c$, and field switch 6 is provided with a normally open auxiliary contact $6^e$. The clutch control device 7 is provided with a normally closed auxiliary contact $7^g$ and a normally open auxiliary contact $7^h$, said contacts being adapted as hereinafter set forth to include and exclude a resistance $r$ in the energizing circuit of winding $7^a$.

The function and operation of the aforedescribed controller, together with the circuit connections thereof will now be more fully set forth in connection with Fig. 2. Upon depression of push button 12 relay 9 is energized by a circuit extending from line $L^1$ through said push button, through push button 13 and the operating winding $9^a$ of said relay to line $L^3$. In responding, relay 9 maintains itself through a circuit extending from line $L^1$ through the auxiliary contact $9^b$ thereof and the normally closed push button 13 to line $L^3$. Upon closure of relay 9, relay 8 is energized by a circuit extending from line $L^1$ through relay 9, through the normally closed auxiliary contact $5^b$ associated with running switch 5, through the operating winding $8^a$ of said relay and through the normally closed auxiliary contact $10^b$ of relay 10 to line $L^3$. Relay 8 in responding establishes an energizing circuit for starting switch 2 extending from line $L^1$ through relay 9 and the auxiliary contact $5^b$ of switch 5 to and through the operating winding $2^a$ of said starting switch and through the auxiliary contact $8^e$ of relay 8 to line $L^3$. Upon response of starting switch 2, starting switch 1 is energized by a circuit extending from line $L^1$ through relay 9 to and through the operating winding $1^a$ of said starting switch and through auxiliary contact $2^b$ of starting switch 2 to line $L^3$. As shown in Fig. 2, one terminal of the armature winding is permanently connected to line $L^2$ and upon response of switches 1 and 2 compensator windings 3 and 4 are connected between lines $L^1$—$L^2$ and $L^2$—$L^3$, respectively, while the other terminals of said armature winding are connected to low voltage taps on said compensator windings. The motor then starts with the field winding thereof connected in shunt across resistance R by contact $6^d$ of field switch 6. It will be observed from Fig. 2 that during starting of the motor the operating winding $11^a$ of series relay 11 is connected in series between the low voltage tap of transformer 3 and one terminal of the armature winding. Relay 11 responds upon the initial inrush of current, but upon a given increase in the speed of the motor the same returns to normal position. Upon return of relay 11 to normal position relay 10 is energized by a circuit extending from line $L^1$ through relay 9, through the operating winding $10^a$ of relay 10, through relay 11 and auxiliary contact $1^b$ of starting switch 1 to line $L^3$. Upon response of relay 10 the same is adapted to maintain itself in closed position through closure of its contacts $10^c$ which shunt the auxiliary contact $1^b$ of starting switch 1, and in responding switch 10 interrupts the aforedescribed energizing circuit of relay 8 through opening of contacts $10^b$. Upon return of relay 8 to normal position, running switch 5 and also the field switch 6 are energized. The energizing circuit for running switch 5 extends from line $L^1$ through relay 9, through the operating winding $5^a$ of said switch, through auxiliary contact $2^c$ of starting switch 2 and contacts $10^c$ of relay 10 to line $L^3$. The energizing circuit for field switch 6 then extends from line $L^1$ through switch 9 and winding $6^a$ of said field switch and through contact $10^d$ of relay 10 and contact $8^d$ of relay 8 to line $L^3$. Upon response of running switch 5, the motor armature is connected directly to lines $L^1$, $L^2$ and $L^3$, and upon response of field switch 6 the field of the motor is connected across the terminals of battery B, through contacts $6^b$ and $6^c$. Following establishment of the aforedescribed running connections for the motor, the clutch control device 7 is energized by a circuit extending from the left hand terminal of battery B through auxiliary contacts $7^g$, through the operating winding of said relay, through the contact $8^c$ of relay 8, through auxiliary contact $5^c$ of running switch 5 and auxiliary contact $6^e$ of field switch 6 to the right hand terminal of said battery. In responding, device 7 connects the clutch winding C across the terminals of battery B with the entire resistance $R^1$ in circuit therewith, and thereafter the contact arms $7^d$, $7^e$ and $7^f$ exclude said resistance from the circuit of said winding. Also, it should be noted that upon response of the clutch control device, contact $7^g$ opens and contact $7^h$ closes to include a protective resistance $r$ in the energizing circuit of winding $7^a$.

As before stated, due to the design of the motor and other conditions, it is necessary in some instances to effect closure of the running switch prior to closure of the field switch, and, in other instances, to reverse the sequence of operation of such switches.

From the foregoing it is apparent that the sequence of operation of running switch 5 and field control switch 6 is controlled by contacts 8$^d$ and 8$^e$ of relay 8. In other words, if contact 8$^d$ closes prior to opening of contact 8$^e$ field switch 6 will close prior to closure of the running switch 5, while opening of contact 8$^e$ prior to closure of contact 8$^d$ will reverse the sequence of operation of such switches. To provide for variation of the sequence of closure of running switch 5 and field switch 6, contacts 8$^d$ and 8$^e$ are slidably mounted upon the operating member 15 of relay 8, and the same have associated stops 16 and 17, respectively. Stops 16 and 17 are threaded upon the operating member 15 and contacts 8$^d$ and 8$^e$ are biased towards their respective stops by springs 18 and 19, respectively. It is apparent that by proper adjustment of the stops 15 and 16 the sequence of operation of switches 5 and 6 can be varied as desired.

In practice it is desirable to energize the clutch winding C only after closure of running switch 5 and field switch 6. For this purpose, contact 8$^c$ of relay 8 is arranged to close after closure of contact 8$^d$ and opening of contact 8$^e$.

What I claim as new and desire to secure by Letters Patent is:

1. The combination with a synchronous motor, of switches for selectively establishing reduced voltage armature connections for starting and full voltage armature connections for running, a switch for connecting the field of the motor to a source of direct current, and control means for the aforesaid switches including means for timing the operation thereof, said latter means including means for varying the sequence of closure of said field control switch and said running switch.

2. The combination with a synchronous motor of electro-responsive switches for selectively establishing reduced voltage armature connections for starting and full voltage armature connections for running, an electro-responsive switch for connecting the field of the motor to a source of direct current and control means for the aforesaid switches including an electro-responsive relay for timing the operation thereof, said relay having contacts which are adjustable to vary the sequence of closure of said field control switch and said running switch.

3. The combination with a synchronous motor of electro-responsive switches for establishing reduced voltage armature connections for starting and full voltage armature connections for running, an electro-responsive switch for connecting the motor field to a source of direct current and control means for the aforesaid switches including a relay subjected to control by current conditions in the motor circuit during starting of the motor, said relay including contacts which are adjustable to vary the sequence of closure of said field control switch and said running switch.

4. The combination with a synchronous motor of electro-responsive switches for selectively establishing reduced voltage armature connections for starting and high voltage armature connections for running, an electro-responsive switch for connecting the motor field to a source of direct current, a relay subjected to control by current in the motor circuit during starting, said relay including means to control the energizing circuits of the aforesaid switches and being adjustable to provide for variation of the sequence of closure of said running switch and said field control switch.

5. The combination with a synchronous motor of electro-responsive switches for establishing reduced voltage armature connections for starting, an electro-responsive switch for establishing high voltage armature connections for running, an electro-responsive switch for connecting the motor field to a source of direct current, and control means for the aforesaid switches including a relay for timing the operation thereof, said relay being responsive to effect closure of said starting switches, and returning to normal position under given current conditions in the motor circuit to effect opening of said starting switch and closure of said running switch and said field control switch, and means associated with said relay for varying the sequence of closure of said running switch and said field control switch.

6. The combination with a synchronous motor of electro-responsive switches for establishing reduced voltage armature connections for starting, an electro-responsive switch for establishing high voltage armature connections for running, an electro-responsive switch for connecting the motor field to a source of direct current, and control means for the aforesaid switches including a relay for timing the operation thereof, said relay being responsive to effect closure of said starting switches and returning to normal position under given current conditions in the motor circuit to effect opening of said starting switch and closure of said running switch and said field control switch, said relay being also adjustable to vary the sequence of closure of said running switch and said field control switch and having means associated therewith for timing return thereof to normal position.

In witness whereof, I have hereunto subscribed my name.

WALTER O. BAER.